United States Patent [19]

Harvey

[11] Patent Number: 4,819,238
[45] Date of Patent: Apr. 4, 1989

[54] WIDE BAND FREE ELECTRON LASER WITH VARIABLE PHASE AND FREQUENCY

[75] Inventor: Robin J. Harvey, Thousand Oaks, Calif.

[73] Assignee: Hughes Aircraft Company, Los Angeles, Calif.

[21] Appl. No.: 112,332

[22] Filed: Oct. 26, 1987

[51] Int. Cl.[4] ............................................... H01S 3/10
[52] U.S. Cl. .......................................... 372/2; 372/24; 372/37; 372/74; 315/3; 315/4
[58] Field of Search .................... 372/2, 37, 73, 74, 20, 372/24, 9; 315/3, 3.5, 4, 5

[56] References Cited

U.S. PATENT DOCUMENTS

| | | | |
|---|---|---|---|
| 3,315,117 | 4/1967 | Udelson | 315/3 |
| 3,916,255 | 10/1975 | Crandall | 315/3 |
| 4,438,513 | 3/1984 | Elias et al. | 372/2 |
| 4,571,726 | 2/1986 | Wortman et al. | 372/2 |
| 4,590,596 | 5/1986 | Wortman et al. | 372/2 |
| 4,599,724 | 7/1986 | McMullin | 372/2 |
| 4,696,815 | 10/1987 | Bhowmik et al. | 372/2 |

FOREIGN PATENT DOCUMENTS

| | | | |
|---|---|---|---|
| 0032647 | 4/1981 | Japan | 315/3.5 |
| 0040742 | 3/1983 | Japan | 315/3.5 |

Primary Examiner—William L. Sikes
Assistant Examiner—Xuan Thi Vo
Attorney, Agent, or Firm—Terje Gudmestad; A. W. Karambelas

[57] ABSTRACT

A free electron laser (FEL) is disclosed in which the phase of the output electromagnetic beam is inherently adjustable without the use of any extraneous optical phase shifting materials. This is accomplished by implementing the FEL as a pair of series-connected wiggler cavity sections, and varying the relative phases of the bunched electron flow in the first cavity section relative to the second. In a preferred embodiment a series of electrodes are provided in a transition region between the two cavity sections, and variable voltages are applied to the electrodes to electrostatically control the electron transit time through the transition region, and the electron velocity upon exiting from that region. This translates into a control over phase and frequency. Alternate embodiments are described in which electromagnets replace the electrodes, and in which the cavity sections are pumped with electromagnetic wiggler waves with the phase of the second cavity pump wave controlled to vary the phase relative to the bunched electron beam. The phase and frequency control can be utilized in an array of such FELs to steer and control the width of the beam emitted by the array.

8 Claims, 5 Drawing Sheets

CONSTANT OUTPUT FREQ.

VARIABLE OUTPUT FREQ.

WIDE BAND FREE ELECTRON LASER WITH VARIABLE PHASE AND FREQUENCY

BACKGROUND OF THE INVENTION

1. Field of the Invention

This invention relates to free electron lasers (FELs), and more particularly to FELs having a controllable phase and frequency for steering an output beam.

2. Description of the Related Art

An FEL amplifies short-wavelength radiation by stimulated emission, using a beam of relativistic electrons. The electrons are not truly "free", since they are under the influence of magnetic forces which cause them to radiate, but they are "free" in the sense that they are not bound into atoms as in the case of a conventional laser. The FEL radiation is usually caused by passing the electrons down a magnetic device known as an undulator or "wiggler", in which the electrons are forced to execute a periodic oscillatory trajectory in space. The wiggler may be a helical field produced by a bifilar helical winding, a linearly polarized field made by a set of alternating polarity magnets, an electrostatic device, or an electromagnetic wave field. The travelling electrons see an oscillating field except at certain regions where they bunch together and travel in synchronism. This causes them to radiate coherently and release appreciable amounts of power. A recent text on this type of device is Thomas C. Marshall, "Free-Electron Lasers", MacMillan Publishing Company, 1985.

FIG. 1 illustrates one conceptual application for the FEL. An array of FEL voltage power supply 4. A stabilized FEL oscillator 6 operates under the control of a frequency synthesizer and controller 8 to produce a local oscillator signal which turns on the FEL amplifiers 2 at a particular phase and frequency. To provide a phased array, phase shifters 10 are provided in front of each FEL amplifier 2 to provide unique phase shifts. The FEL amplifier outputs are directed onto an antenna array 12 which radiates the array of signals as a radar beam 14. The angle (direction) of beam 14 is controlled by the relative phases of the signals emitted from the various FEL amplifiers, while the divergence or width of beam 14 is controlled by the FEL frequencies. By controlling the phase shifters 10 such that each successive FEL amplifier in the array has a progressively greater or smaller phase shift, the output wavefronts from each FEL amplifier in succession will be slightly delayed or retarded with respect to the wavefront for the previous FEL. This causes the beam 14 to be transmitted at an angle, in a manner analogous to the change in angle of an optical beam transmitted at an angle between materials of different refractive indices.

A principal problem in implementing this type of phased array is that currently known phase shifters 10 are relatively narrow band, and cannot be used over a wide portion of the electromagnetic spectrum. Waveguides cannot be used for phase shifting, since their diameters are normally in the quarter wavelength range; this is too small for FELs, which are typically many wavelengths in diameter. Accordingly, phase shifters which have been proposed are large area optical materials that produce a phase shift at a given wavelength. A different phase shifting material is needed at each different frequency band, and for sub-mm wavelength signals (infrared) it is difficult to find transparent materials with the desired optical properties. Another representative application for phase shifting is to encode the waveform during a pulse in order to perform accurate radar measurements. Generally, radar systems require an ability to rapidly alter the phase of the signal by 180° or to induce a chirp or frequency change by continuously adjusting the phase.

SUMMARY OF THE INVENTION

In view of the above problems, one purpose of the present invention is to provide an FEL which is inherently capable of achieving phase shifts over a very wide frequency range.

Another purpose is to provide an FEL which operates directly in response to applied control signals to accomplish a phase shift without the use of any extraneous optical phase shifting materials.

The invention also seeks to provide a phased array of FELs that is capable of operating over a wide frequency range to steer a radar beam produced by the array or to encode the radar waveform.

In accordance with the invention, an FEL is divided into first and second cavity sections, with each section including a wiggler means for coherently bunching electrons. The cavity sections are coupled in series, with the first section receiving an electron beam and the second section emitting an output beam. Signal control means are provided to vary the flow of the electrons in one cavity section relative to the other cavity section, and thereby vary the emitted beam. The electron flow varying means operate on the relative phase and/or velocity of the beam in the two sections, thereby controlling the output beam direction and/or width.

In one embodiment the cavity sections are coupled by a flow transition region within which a series of electrodes are located. Voltage differentials are applied across the electrodes to electrostatically vary the beam's phase and/or frequency. With the use of two successive pairs of electrodes, the velocity of the beam can first be altered and then restored to its original velocity, thereby effecting a phase shift with no net change in frequency. By making the voltage differentials across the two electrodes different, a net change in velocity (and thus frequency) can also be produced. In either case the voltage differentials are variable, thereby permitting the output beam to be easily controlled.

In another embodiment a series of electromagnets are provided in the transition region to deflect the electrons away from their original path, and then restore them back to the same path. This produces a change in the effective length of the beam path, with a corresponding phase shift which is controlled by the degree of deflection.

In another embodiment, relatively low frequency electromagnetic waves are pumped into each cavity section to provide the wigglers. The general concept of using higher power electromagnetic radiation to replace the magnetic wiggler is described in Luis R. Elias et al., U.S. Pat. No. 4,438,513, issued Mar. 20, 1984 (assigned to the Secretary of the Navy), although Elias does not consider multiple cavities. Means are provided to vary the phase of the low frequency electromagnetic wave pumped into the first cavity section, whereby the phase of the higher frequency beam, transmitted and amplified through the FEL mechanism in the cavity sections, can be controlled.

The invention thus provides a mechanism for controlling the outputs of individual FELs or FELs in a phased array by the application of external control signals to the FELs, rather than by the use of limited bandwidth optical phase shifting materials. This enables electronically controlled operation over a much greater frequency range, and completely avoids the need to locate and insert different phase shifting materials for each different frequency range.

These and other features and advantages of the invention will be apparent to those skilled in the art from the following detailed description of preferred embodiments, taken together with the accompanying drawings, in which:

DETAILED DESCRIPTION OF PREFERRED EMBODIMENTS

Figure 1:
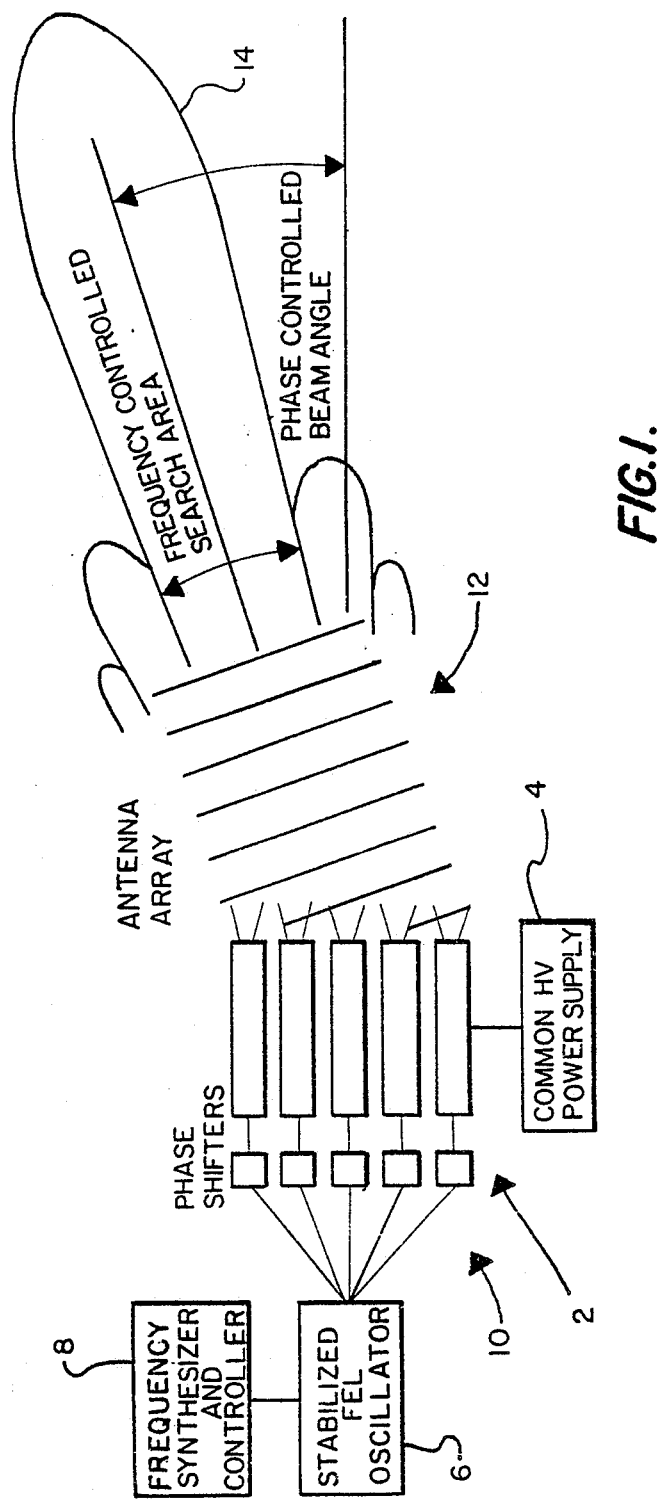
FIG. 1 is a block diagram of a conceptual FEL phased array system.
Figure 2:
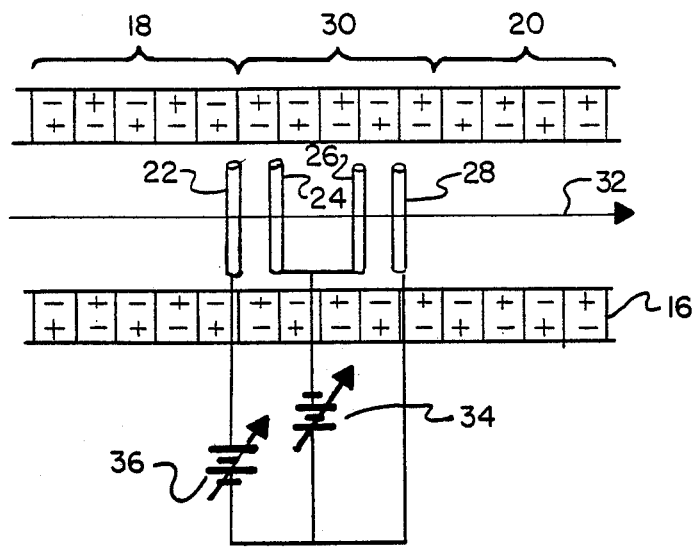
FIG. 2 is a simplified sectional view of an FEL in which the beam phase and frequency are controlled by voltage signals applied to a series of electrodes in accordance with the invention.

A first embodiment of the invention is shown in FIG. 2. An FEL cavity bounded by a series of magnets 16 of alternating polarity is divided into a first cavity section 18 and a second cavity section 20 in series with cavity section 18 by a series of electrodes 22, 24, 26 and 28 located within a transition or drift region 30 between the two cavity sections 18 and 20 which may optionally contain wiggler magnets. The electrodes may be circular, and are located near the inner walls of magnets 16 so that an electron beam 32, transmitted through the series-arranged cavity sections, will pass through the electrodes. The electrodes are also arranged so that they do not obstruct the radiation field generated by the FEL mechanisms.

The electrodes are functionally divided into two pairs, with the first pair 22, 24 located on the input side and the other pair 26, 28 on the output side. The inner two electrodes 24, 26 are connected in common and maintained at a voltage differential from the other electrodes by means of a variable voltage source 34. As discussed below, the setting of voltage source 34 controls the phase of the electron beam 32, relative to the phase of the radiation field and the wiggler magnets. A voltage differential is developed between the two outermost electrodes 22, 28 by a second variable voltage source 36 which, as explained below, controls the frequency of the emitted radiation.

As the electrons in beam 32 progress through the FEL cavities, the alternating transverse pole of magnets 16 imposes a "wiggle" motion on the electrons which under the combined influence of the wiggler fields and the radiation field (not shown) causes them to bunch together. The coherent wiggling of the bunched electrons causes additional radiation which adds coherently to the existing radiation, as previously known. The present invention operates by adjusting the phase of the bunched electrons in real time, and thereby the phase of the output beam from the FEL; the velocity of the bunched electrons can also be changed in real time to control the output frequency.

Figure 3:
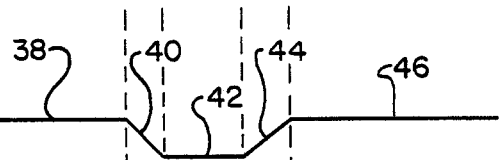
FIGS. 3(a)-(d) are traces of the beam velocity and phase for different operating conditions of FIG. 2.
Figure 3:
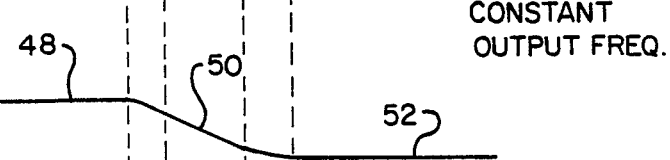
Figure 3:
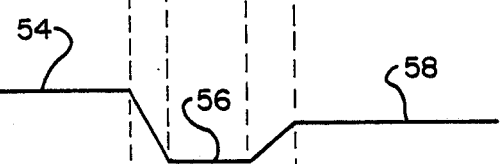
Figure 3:
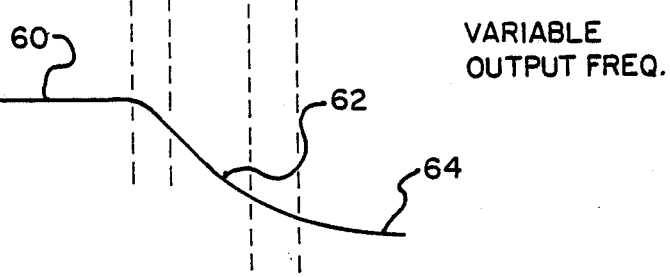

The operation of the device will be explained with reference to FIGS. 3(a)-(d). FIGS. 3(a) and 3(b) represent the situation when the beam's output frequency is constant; for this purpose voltage source 36 can be assumed to be set at zero or short-circuited, tying the outermost electrodes 22, 28 together. As shown in FIG. 3(a), the electrons in beam 32 will initially travel through the first cavity section 18 at a velocity 38, and are bunched to some degree by the action of the wiggler and radiation fields. The bunching has an identifiable phase relative to the wiggler and radiation fields. In the absence of voltage applied to the electrodes, the bunched electrons will arrive in the second section of the wiggler with a particular phase and act to amplify or, in the case of an oscillator, sustain emission of the radiation field at a fixed phase of the radiation field. Assuming the first electrode 22 is set at a higher potential than the second electrode 24, then the electron velocities will slow down between these two electrodes as indicated at 40. Electrodes 24 and 26 are at the same electric potential, so the electrons will flow at a constant velocity 42 between these electrodes. The voltage on electrode 28 exceeds that on electrode 26 by the same voltage differential as between electrodes 22 and 24, causing the electrons to accelerate back to their original velocity between electrodes 26 and 28, as indicated at 44. Thereafter the electrons will continue flowing through the second cavity section at their original velocity, as indicated at 46.

This change in electron velocity directly translates into a controlled amount of phase shift. When the electrons slow down, their phase lags the original phase; when the electrons speed up, their phase likewise advances. This is illustrated in FIG. 3(b), which shows the phase situation for the electron velocity profile of FIG. 3(a). The initial beam phase before the application of the external voltages is indicated at 48 in the first cavity section. When the electrons are slowed down, the beam phase progressively lags behind its original phase, as indicated at 50. When the beam velocity is restored to its original level by electrodes 26, 28, the beam phase levels off at a constant lagging amount 52. Of course, reversing the polarity of the externally applied control voltage 34 would cause the beam velocity to first increase rather than decrease during the transition area, resulting in a leading rather than a lagging phase shift. In either case, the amount of velocity variation and the overall phase shift varies directly with the magnitude of the voltage differential produced by variable source 34 and the length of the drift region between electrodes 24 and 26.

The effect of adding in variable voltage source 36 is considered in FIGS. 3(c) and 3(d). In these figures it is assumed that the outputs of sources 34 and 36 are approximately equal, and that the polarity of source 36 adds to the voltage diferential established by source 34 between electrodes 22 and 24. Due to this addition of voltages, in FIG. 3(c) the beam velocity decreases from its initial level 54 by a greater amount than the velocity decrease from voltage source 34 alone (FIG. 3(a)). The electrons continue at their lower velocity 56 in the drift region between equal potential electrodes 24 and 26. Between the second pair of electrodes 26, 28 the electron velocity is increased, but by a lesser amount than the original velocity reduction because the voltage differential between electrodes 26 and 28 sees only the single voltage source 34. Thus, the electron beam travels through second cavity section 20 at a lower velocity 58 than in the first cavity section 18. Since it passes by wiggler magnets 16 at a lower velocity in the second section, and therefore more time elapses between each electron oscillation at the successive magnets, the frequency of the radiation generated by the FEL mechanism decreases by a corresponding amount.

The corresponding phase situation is shown in FIG. 3(d). Initially in-phase in the first cavity section as indicated by 60, the beam phase falls behind in the transition region as indicated by 62 at a faster rate than in FIG. 3(b), due to the lower velocity of the electrons in this region. Since the final electron velocity in the second cavity section is less than in the first cavity section, the phase lag continues to increase in the second cavity section as indicated by 64, but at a lesser rate than in the transition region due to the partial restoration of the beam's original velocity in the second cavity section.

Theoretically, voltage source 34 could be set to zero (short-circuited), and only voltage source 36 used. In this case the beam electrons would undergo a one-time shift in velocity and frequency. However, the velocity/frequency shift would be more abrupt than the desirably smooth transition achieved with the use of both voltage sources 34 and 36. In addition, changes in voltage in region 20 act to alter the gain of the FEL. Such gain changes are known generally to alter the phase of laser oscillators through the imaginary part of the gain, and care must be taken to correct for this effect if only frequency change is desired.

The device shown in FIG. 2 thus provides a mechanism for independently controlling the phase and frequency of the FEL output by simple voltage adjustments, without the use of any extraneous optical phase shifting media. It is capable of operating over a much wider frequency spectrum than any suitable optical phase shifting medium currently known.

Figure 4:
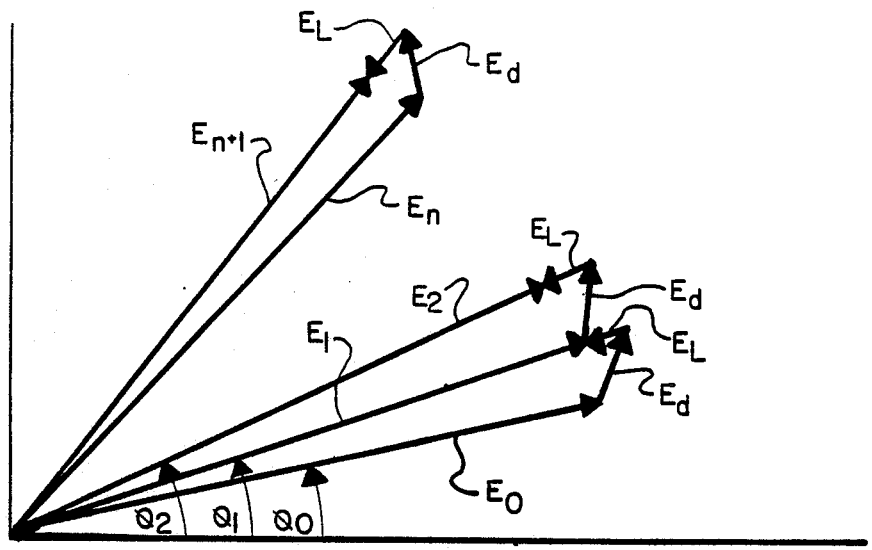
FIGS. 4 and 5 are a vector diagram and a graph, respectively, illustrating the phase shifting achieved with the invention.

FIG. 4 is a vector diagram illustrating the phase shift just described. The angle $\phi_0$ of the electric field vector $E_0$ represents the initial phase of the radiation field. $E_d$ represents the incremental gain in the electric field at a phase shift $\Delta\phi$ during an incremental period of time when the phase of the bunched electron has been shifted a corresponding amount; because the FEL is operated in saturation, an energy loss represented by $E_L$ is encountered which results in the net electric field vector $E_1$, which is rotated to a new phase angle $\phi_1$. If it is assumed that the beam continues travelling at the same modified phase, the phase vector will continue rotating to a new location $E_2$ at phase angle $\phi_2$. The differential vector $E_d$ and loss vector $E_L$ rotate along with the principal vector to yield $E_2$. The phase and electric vector will continue to rotate in this manner until the phase of the electron beam bunches is again changed. To generalize, at a later time in the phase shift the electric field vector will be at $E_n$; an incremental phase shift will rotate the vector to $E_{n+1}$, which has the same vector length as $E_n$ because of $E_d$ and $E_L$.

Figure 5:
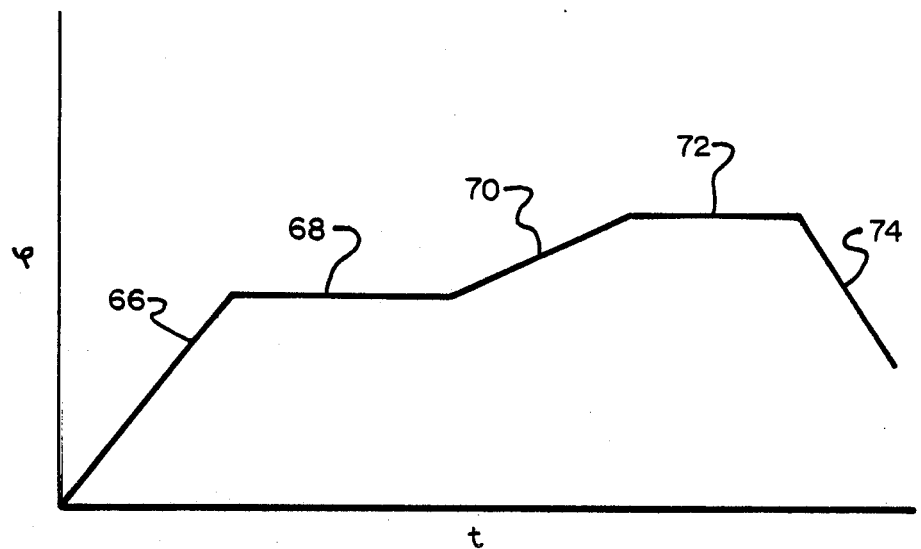

FIG. 5 illustrates the output FEL phase over time as the control electrodes are turned on and off. It is assumed that the voltage source 34 is initially set at a greater than zero level. This causes the phase to initially ramp up (or down, depending upon the voltage polarity) along line 66. If the control voltage is then set to zero, the beam velocity will remain constant and the phase will plateau along 68. If the voltage source is then turned back on but at a lower level, the phase will again ramp up as at 70, along a reduced ramp. Turning the voltage off will again cause the phase to plateau, as at 72. If the voltage is again turned on but with a reversed polarity, the phase will then ramp downward along 74 back toward its initial level. Thus, both the direction and rate of phase shift is easily controllable with a simple adjustment to the external voltage source 34; a similar control over the FEL output frequency is provided by voltage source 36.

Figure 6:
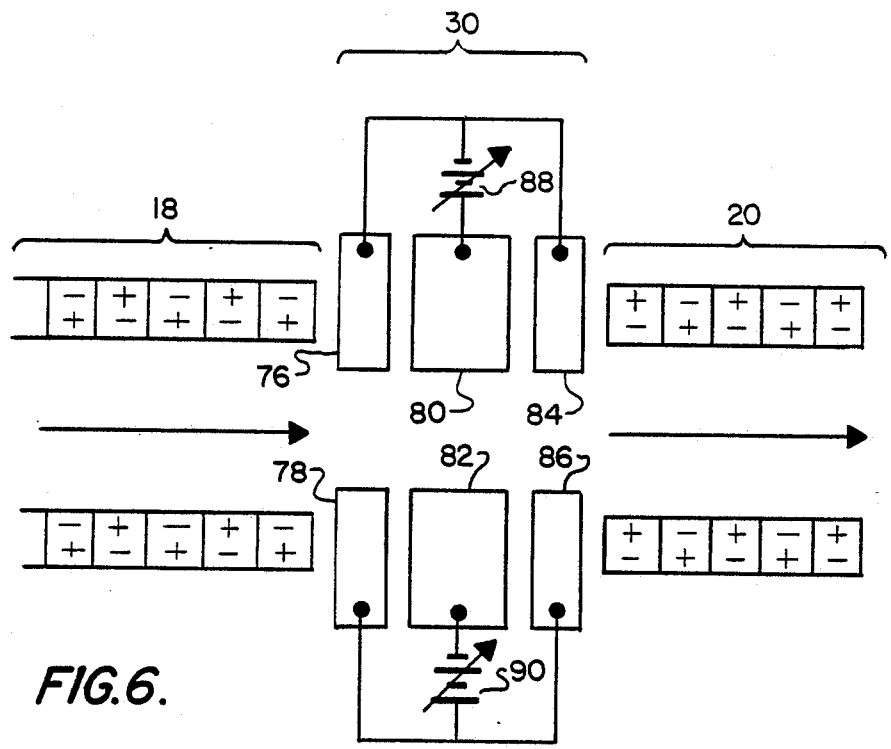
FIG. 6 is a simplified sectional view of another embodiment of the invention which employs electromagnets to control the beam phase.

FIG. 6 represents another embodiment of the invention, in which the electrostatic electrodes are replaced with three pairs of electromagnets 76/78, 80/82 and 84/86 in the FEL transition region. Each pair of electromagnets is disposed on opposite sides of the cavity and when activated by power sources 88 and 90 act to cause the trajectory of the electron beam to be shifted off of the axis and then returned to the axis. Optimally, the magnets 76–86 may have the same general period as the wiggler magnets 16 (FIG. 2), or they may be located to produce a single wiggler motion in a transverse direction which is superimposed upon the normal wiggler motion. Equal but opposite polarities are established between the upper middle electromagnet 80 and its adjacent outer electromagnets 76, 84, and between lower middle electromagnet 82 and its respective adjacent outer electromagnets 78, 86 by ganged-variable voltage sources 88 and 90. The electromagnets operate to deflect the beam electrons first away from their original path, and then back to their original path, thereby lengthening their effective path and producing a corresponding phase shift.

Figure 7:
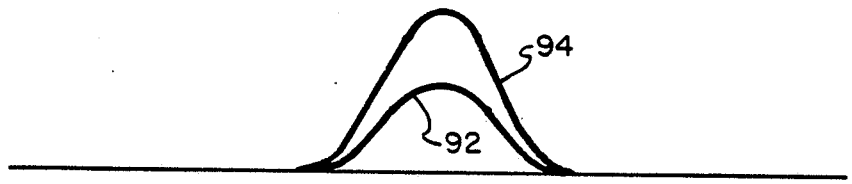
FIG. 7 is a trace of different electron beam paths produced by the embodiment of FIG. 6.

The beam deflection is illustrated in FIG. 7. For a relatively low voltage differential applied by sources 88 and 90, the electrons will be urged in one direction by the outer electromagnets 76/78 and 84/86, and in the opposite direction by inner electromagnets 80/82. The strength of the inner electromagnets are adjusted relative to the outer electromagnets so that the cumulative deflection produced during electron transit between two sets of outer electromagnets and the single inner set of electromagnets will net to zero. This is illustrated in FIG. 7, for a relatively low deflection voltage, by electron path 92. The electrons will be deflected in one direction as they pass between outer electromagnets 76 and 78, and will continue to travel in the deflected direction until coming under the influence of inner electromagnets 80, 82. Thereafter the deflection will gradually peak and then begin to diminish in a progressively increasing fashion until the electrons have passed beyond the inner electromagnets. The electrons will continue to travel in the same direction until gradually restored to their original path under the influence of the final pair of electromagnets 84, 86. The effect will be similar when the outputs of ganged voltage sources 88, 90 are increased, but with a greater overall deflection as indicated by line 94.

By thus deflecting the electrons from their original path, their actual path is increased. It thus takes them more time to transit the FEL, and this translates to a phase shift. The amount of phase shift is controlled by simply adjusting the variable voltage sources.

Figure 8:
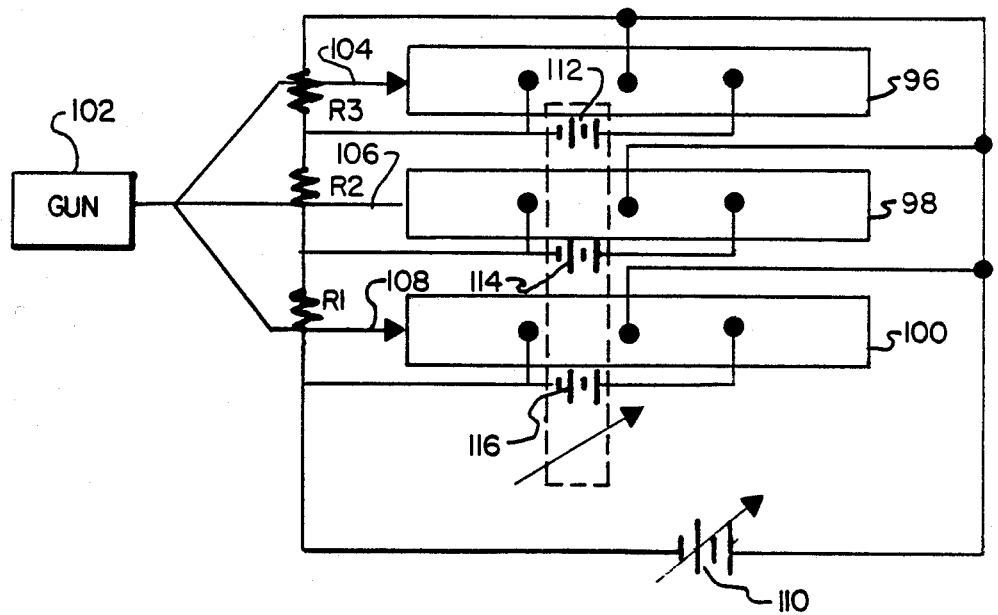
FIG. 8 is a simplified block diagram of a phased array of FELs utilizing the embodiments of either FIG. 2 or FIG. 6.

A simplified phased array of FELs in accordance with the embodiments of FIG. 2 is shown in FIG. 8. In this embodiment three FELs 96, 98, 100, and one electron gun, 102, although in practice a greater number would normally be utilized. The beam electrons are initially accelerated in a diode structure or gun 102, which includes either a hot or a cold cathode together with focusing elements and/or a guide magnetic field. The FEL cavities would be primed by injecting external signals into the cavities to initially synchronize them; waveguides or conventional couplers (not shown) can be used for this purpose. Electron beams 104, 06 and 108 are directed into FELs 96, 98 and 100, respectively. The inner control electrodes of each FEL are connected in common to one terminal of a common variable voltage source 110. The other terminal of the voltage source is connected to a voltage divider network consisting of resistors R1, R2 and R3 in series. The outer electrodes of the various FELs are connected to different points in the voltage divider such that progressively increasing voltage differentials between the inner and outer electrodes are established for FLLs 96, 98 and 100, respectively. Thus, any adjustment of variable voltage source 110 will shift the phases of each of the FELs, but by progressively increasing amounts. A variable gradient is thereby created in the phases of the electron beams emitted from the successive FELs in the array, and this steers the collective beams emitted from the FELs.

Frequency control, and thereby control over the width of the emitted beam, is provided by ganging variable voltage sources 112, 114 and 116 between the outer electrodes of FELs 96, 98 and 100, respectively. Since a common voltage differential (but not absolute voltage levels) is established between the outer electrodes for each FEL, the FEL frequencies will vary in common.

Figure 9:
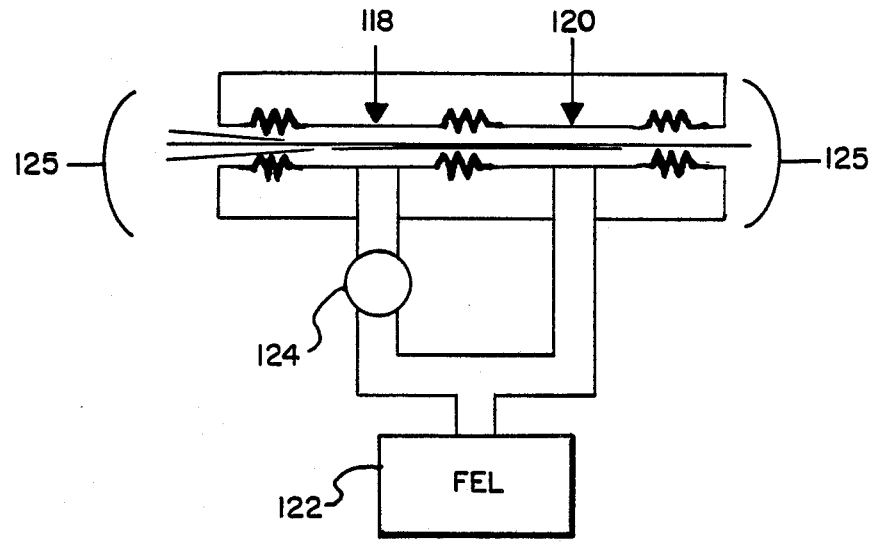
FIG. 9 is a block diagram of another embodiment of the invention in which the FEL is pumped by two electromagnetic waves, one of which is variable.

Another approach to the variable phase FEL of the invention is illustrated in FIG. 9. This is a two-stage FEL in which the wiggler is implemented by an electromagnetic wave field, rather than an alternating series of magnets. It is used for high frequencies above the range of the electro-mechanical wigglers. The first and second FEL cavity sections 118, 120, which replace the wiggler magnets of the FEL, are pumped with a high intensity, lower frequency electromagnetic wave from a separate FEL 122. This produces a higher frequency of electron beam modulation within the FEL cavity sections 118, 120, and a higher frequency radiation field is generated. The resonant cavity for the higher frequency is formed by mirrors 125, which are typically located external to cavity sections 118 and 120. This type of high frequency electromagnetic wave pumping is known for a single FEL cavity, but in accordance with the present invention both cavities of a two-section FEL are pumped, while the phase of the electromagnetic wave introduced into the second cavity section 120 is varied relative to the phase of the electron beam as it enters the second cavity section 120. In the embodiments of FIGS. 2 and 6, the flow of the electron beam was varied with respect to the stationary electromagnetic wigglers. In the embodiment of FIG. 9, by contrast, the electromagnetic wave which provides the wiggler effect for the first cavity section 118 is itself modulated relative to the electron beam bunches and the radiation field to achieve the desired phase shift.

This is accomplished by means of a wave phase shifter 124 which can be of conventional design, or alternately can be implemented by the phase-adjustable FELs of FIGS. 2 or 6. The wave modulation causes the phase of the electromagnetic field pumped into the second cavity section 120 to shift relative to the electron bunches entering from cavity section 118, and thereby effects a phase in the shift corresponding output phase of the optical radiation field.

Various embodiments of a novel FEL capable of phase adjustment and also frequency adjustment over a very wide frequency range, and a related phased array of such adjustable FELs, have thus been shown and described. As numerous modifications and alternate embodiments will occur to those skilled in the art, it is intended that the invention be limited only in terms of the appended claims.

I claim;

1. A variable free electron laser, comprising:
   first and second free electron laser cavity sections coupled in series by a flow transition region for electrons to flow from the first to the second cavity section, the first cavity section receiving an applied electron beam and the second cavity section receiving bunched electrons from the first cavity section and emitting output radiation in response thereto, each cavity section including a wiggler means for coherently bunching electrons flowing through the cavity section;
   successive pairs of electrodes in the flow transition region spaced in the direction of electron flow; and
   means for applying variable voltage differentials across said electrodes which accelerate the electrons between one electrode pair and decelerate the electrons by a substantially equal amount between another electrode pair, whereby the phase of the generated radiation field is varied.

2. A variable free electron laser, comprising:
   first and second free electron laser cavity sections coupled in series by a flow transition region for electrons to flow from the first to the second cavity section, the first cavity section receiving an applied electron beam and the second cavity section receiving bunched electrons from the first cavity section through the flow transition region and emitting output radiation in response thereto, each cavity section including a wiggler means for coherently bunching electrons flowing through the cavity section;
   successive pairs of electrodes disposed in the flow transition region and mutually spaced in the direction of electron flow;
   first voltage differential applying means for varying the voltage difference across successive electrode pairs in a complementary manner to vary the phase of the electron beam between said pairs; and
   second voltage differential applying means for varying the net voltage across all of said electrodes to vary the beam velocity, and thereby the frequency of the generated radiation field.

3. The variable free electron laser of claim 2 wherein said first and second voltage differential applying means are independently controllable.

4. A variable free electron laser, comprising:
   first and second free electron laser cavity sections for respectively receiving and emitting an electron beam, the cavity sections being arranged in series for electrons to flow through the first and second cavity sections in order and coupled by a flow transition region, each cavity section including means imposing a periodic oscillatory trajectory normal to the general direction of electron flow upon electrons flowing through the section to generate an electromagnetic radiation field;

three pairs of electromagnet is in the flow transition region spaced in the direction of electron flow; and means for applying variable energizing signals to the first second electromagnets in the electron path which successively deflect the electrons from and then restore the electrons to their original beam path, and to the third electormagnet which restores the electrons to their original direction along the original beam path, thereby varying the phase of the electron beam and the generated radiation field in accordance with the amount of electron deflection.

5. A variable free electron laser, comprising:

first and second free electron laser cavity sections for receptively receiving and emitting an electron beam, the cavity sections being arranged in series for electrons to flow through the first and second cavity sections in order and coupled by a flow transition region;

means for pumping the cavity sections with electromagnetic waves to produce a wiggler effect on the electron beam, said wiggler effect generating an electromagnetic radiation field at a frequency substantially higher than the pumping electromagnetic wave frequency; and means for varying the phase of the electromagnetic wave introduced into the second cavity section and thereby vary the phase of the radiation field generated in the second cavity section.

6. A phased array free electron laser arrangement with controlled beam steering, comprising:

an array of free electron lasers (FELs), each FEL comprising first and second cavity sections coupled in series by a flow transition region for electrons to flow from the first to the second cavity section, the first cavity section receiving and the second cavity section emitting an electron beam and generating an electromagnetic radiation field, each cavity section including a wiggler means for coherently bunching electrons flowing through the cavity section, each transition region having disposed therein successive pairs of spaced electrodes, and voltage differential applying means for applying voltage differentials across said electrode pairs to accelerate the electrons between one electrode pair and deaccelerate the electrons by a substantially equal amount between the other electrode pair within each respective FEL, whereby the phase of the generated radiation field is varied.

7. A phased array free electron laser arrangement with controlled beam steering, comprising:

an array of free electron lasers (FELs), each FEL comprising first and second free electron laser cavity sections for respectively receiving and emitting an electrons to flow through the first and second cavity sections in order and coupled by a flow transition region, each cavity section including means imposing a periodic oscillatory trajectory normal to the general direction of electron flow upon electrons flowing through the section to generate an electromagnetic radiation field, each flow transition region having disposed therein three electromagnets spaced in the direction of electron flow, and means for applying variable energizing signals to the first and second magnets in the electron path which successively deflect the electrons from and then restore the electrons to their original beam path, and to the third electromagnet which restores the electrons to their original direction along the original path, thereby producing a variable gradient in the phases of the radiation field emitted from the successive FELs which steers the collective electromagnetic beams emitted from the FELs.

8. A phased array free electron laser arrangement with controlled beam steering, comprising:

an array of free electron lasers (FELs), each FEL comprising first and second free electron laser cavity sections for respectively receiving and emitting an electron beam, the cavity sections being arranged in series for electrons to flow through the first and second cavity sections in order and coupled by a flow transition region, and means for pumping the cavity section with electromagnetic waves for producing a wiggler effect on the electron beam, said wiggler effect generating an electromagnetic radiation field at a frequency substantival higher than the pumping electromagnetic wave frequency, and means for varying the phase of the electromagnetic wave introduced into the second cavity section and thereby vary the phase of the radiation field generated in the second cavity section, thereby producing a variable gradient in the phases of the radiation field emitted from the successive FELs which steers the collective electromagnetic beams emitted from the FELs.

* * * * *